US012811970B2

(12) United States Patent
Singh

(10) Patent No.: US 12,811,970 B2
(45) Date of Patent: Nov. 24, 2026

(54) MACHINE LEARNING-BASED SYSTEM FOR DETECTING CYBER ATTACK BASED ON ACOUSTIC AND NON-ACOUSTIC DATA

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/011,851

(22) Filed: Jan. 7, 2025

(65) Prior Publication Data

US 2026/0197329 A1 Jul. 9, 2026

(51) Int. Cl.
*H04L 29/06* (2006.01)
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 7,191,090 | B1 | 3/2007 | Cunningham |
| 9,998,491 | B2 | 6/2018 | Ahmed et al. |
| 10,416,629 | B1 | 9/2019 | Bingham et al. |
| 11,075,956 | B2 | 7/2021 | Burke et al. |
| 11,233,804 | B2 | 1/2022 | Arzani et al. |
| 11,463,457 | B2 | 10/2022 | Bazalgette et al. |
| 11,558,269 | B2 | 1/2023 | Jing et al. |
| 12,271,971 | B1 | 4/2025 | Sanchez et al. |
| 12,547,490 | B1 | 2/2026 | Roche et al. |
| 2015/0102927 | A1 | 4/2015 | Johnson et al. |

(Continued)

FOREIGN PATENT DOCUMENTS

| | | | |
|---|---|---|---|
| WO | 2020086415 A1 | 4/2020 | |
| WO | WO-2023208921 A1 * | 11/2023 | .......... A61M 15/008 |

OTHER PUBLICATIONS

Lars Wustrich et al. "AC/DCIM: Acoustic Channels for Data Center Infrastructure Monitoring" IEEE 2022, 5 pages.

(Continued)

*Primary Examiner* — Andrew J Steinle
(74) *Attorney, Agent, or Firm* — Banner & Witcoff, Ltd.

(57) ABSTRACT

Arrangements for using machine learning to detect cyber attacks based on acoustic and/or non-acoustic data are provided. In some examples, a computing platform may receive acoustic and/or non-acoustic data from one or more sensors in a data center. The platform may input the data to a machine learning model and execute the model to output a noise scenario and noise scenario score associated with the acoustic and/or non-acoustic data. Based on the output noise scenario and noise scenario score, the platform may determine that an anomaly is detected in the data. The platform may determine whether a smart contract corresponding to the noise scenario exists. If so, a mitigation rule from the noise scenario may be retrieved. If not, the model may be executed to dynamically generate a mitigation rule. The platform may then execute one of the retrieved mitigation rule or the dynamically generated mitigation rule.

20 Claims, 11 Drawing Sheets

(56) References Cited

U.S. PATENT DOCUMENTS

| | | | |
|---|---|---|---|
| 2016/0044429 | A1 | 2/2016 | Moffat |
| 2016/0380770 | A1 | 12/2016 | Whitmer |
| 2017/0034160 | A1 | 2/2017 | Brands et al. |
| 2017/0322241 | A1 | 11/2017 | Tang et al. |
| 2018/0096574 | A1 | 4/2018 | Ekambaram et al. |
| 2018/0158454 | A1 | 6/2018 | Campbell et al. |
| 2018/0285576 | A1 | 10/2018 | Cannings et al. |
| 2019/0044641 | A1 | 2/2019 | Trundle et al. |
| 2019/0132652 | A1 | 5/2019 | Zhao et al. |
| 2019/0237096 | A1 | 8/2019 | Trella et al. |
| 2019/0253441 | A1 | 8/2019 | Horstmeyer et al. |
| 2019/0261109 | A1 | 8/2019 | Das |
| 2021/0193154 | A1 | 6/2021 | Zhang et al. |
| 2021/0298688 | A1 | 9/2021 | Banerjee et al. |
| 2021/0326437 | A1 | 10/2021 | Juliato et al. |
| 2022/0191224 | A1 | 6/2022 | Ståhlberg et al. |
| 2023/0086355 | A1 | 3/2023 | Wichern et al. |
| 2023/0186939 | A1 | 6/2023 | Tang et al. |
| 2023/0274757 | A1 | 8/2023 | Oku et al. |
| 2023/0412997 | A1 | 12/2023 | Bouvigne et al. |
| 2024/0089128 | A1 | 3/2024 | Vialar et al. |
| 2024/0153524 | A1 | 5/2024 | Bondi et al. |
| 2024/0422561 | A1* | 12/2024 | Montalvo ............... G06F 30/27 |
| 2025/0023888 | A1 | 1/2025 | Reynolds et al. |
| 2025/0209167 | A1 | 6/2025 | Aljurayyad et al. |
| 2025/0308204 | A1 | 10/2025 | Chen et al. |
| 2026/0104325 | A1 | 4/2026 | MacLean et al. |

OTHER PUBLICATIONS

May 7, 2026—(US) Non-Final Office Action—U.S. Appl. No. 19/011,819.

Wustrich, Lars, et al., “Shells Bells: Cyber-Physical Anomaly Detection in Data Centers” NOMS 2024-2024 IEEE Network Operations and Management Symposium. IEEE, Jul. 2024.

Seridi, Mehdi et al. “Intelligent Monitoring of Data Center Physical Infrastructure: A Comprehensive Literature Review”, 2025 International Conference on Intelligent Systems: Theories and Applications (SITA), IEEE, Oct. 2025.

Sadighi, Leyla et al., “ML-Based Detection and Categorization of Complex Mechanical Vibrations via State of 4 Polarization Analysis in Optical Netowrks”, 2025 25th Annaversary International Conference on Transparent Optical Networks (ICTON). IEEE, Jul. 2025.

* cited by examiner

MACHINE LEARNING-BASED SYSTEM FOR DETECTING CYBER ATTACK BASED ON ACOUSTIC AND NON-ACOUSTIC DATA

BACKGROUND

Aspects of the disclosure relate to electrical computers, systems, and devices for using acoustic and/or non-acoustic data to detect cyber attacks at data centers.

Data centers are vital to every enterprise. Data centers often house sensitive customer and business information, as well as critical business applications. Accordingly, data centers are often a target of cyber attacks by threat actors attempting to capture customer and/or business data and/or disrupt operations of the data center. Aspects described herein provide an innovative way to detect cyber attacks and potential cyber attacks at data centers using acoustic and/or non-acoustic data captured at the data center.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with detecting cyber attacks in a data center.

In some examples, a computing platform may receive acoustic and/or non-acoustic data from one or more sensors in a data center. The computing platform may generate a spectrogram based on the data and one or more features may be extracted from the spectrogram. In some examples, the extracted features may be input to a machine learning model to output a noise scenario and corresponding noise scenario score associated with the acoustic and/or non-acoustic data.

Based on the output noise scenario and noise scenario score, the computing platform may determine that an anomaly is detected in the acoustic and/or non-acoustic data. The computing platform may determine whether a smart contract corresponding to the noise scenario exists. If so, a mitigation rule from the noise scenario may be retrieved. If not, the machine learning model may be executed to dynamically generate a mitigation rule. A smart contract including the dynamically generated mitigation rule may be generated and stored. The computing platform may then execute one of the retrieved mitigation rule or the dynamically generated mitigation rule.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, data centers are often a target for threat actors looking to obtain customer data, business data and/or to disrupt business operations of an enterprise organization. Accordingly, arrangements described herein aim to detect cyber attacks using machine learning to analyze acoustic and/or non-acoustic data captured at the data center in order to detect anomalies, determine a nature of an anomaly, generate mitigation actions and execute mitigation actions in order to reduce impact of cyber attacks.

During the normal course of operation, data centers generate sounds or noise (e.g., acoustic data). For instance, as processors process data, a humming sound may be emitted. Further, cooling systems within the data center may emit sounds when operating, when cycling on and off, and the like. In addition, threat actors may use radio frequency technology to disrupt operations of data centers. Accordingly, by using sensors within data centers to capture acoustic and non-acoustic data (e.g., radio frequency data), baseline or expected data may be determined and anomalies from the expected or baseline data may be detected, mitigation actions may be identified and executed, and the like.

These and various other arrangements will be discussed more fully below.

Figure 1A:
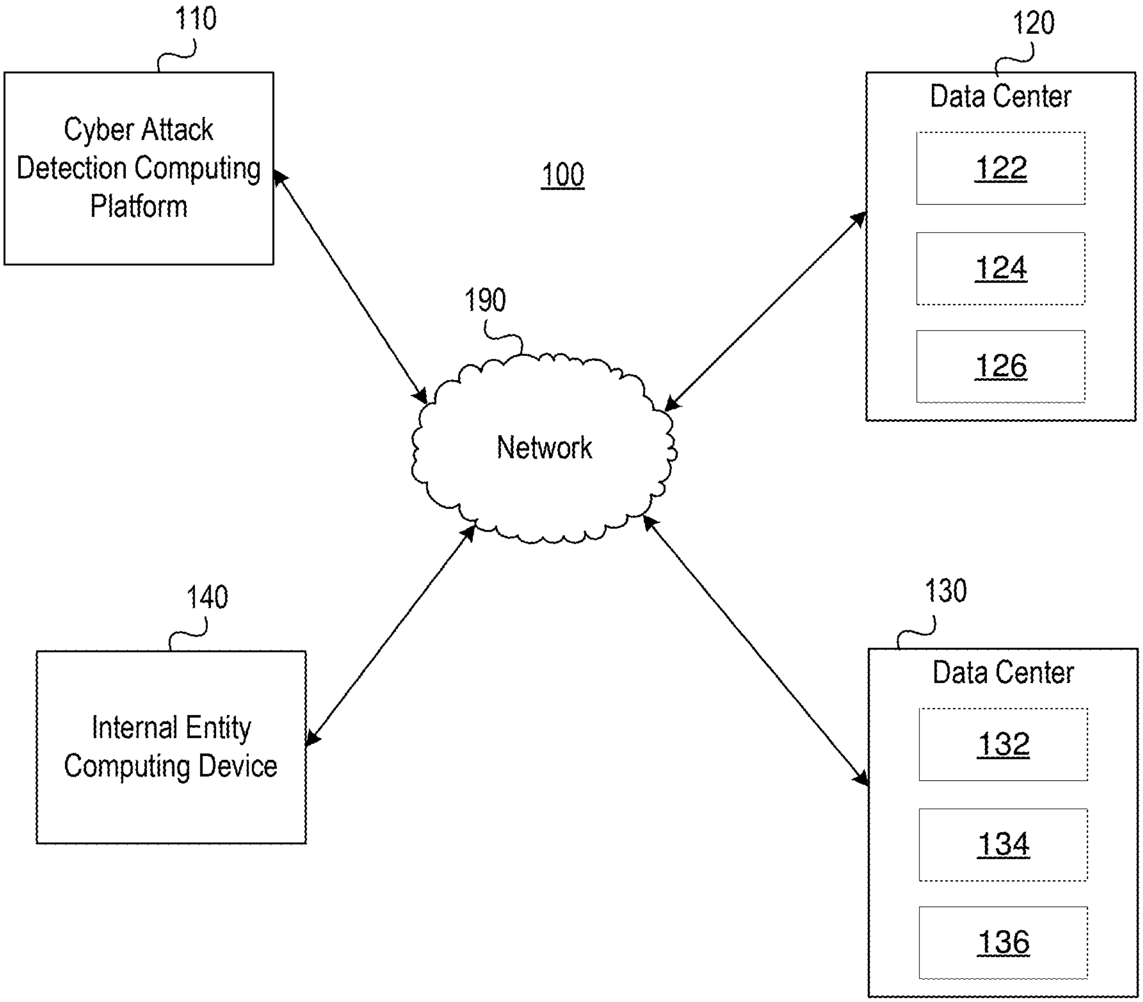
FIGS. 1A-1B depict an illustrative computing environment for using machine learning to detect cyber attacks based on acoustic and non-acoustic data in a data center in accordance with one or more aspects described herein.
Figure 1B:
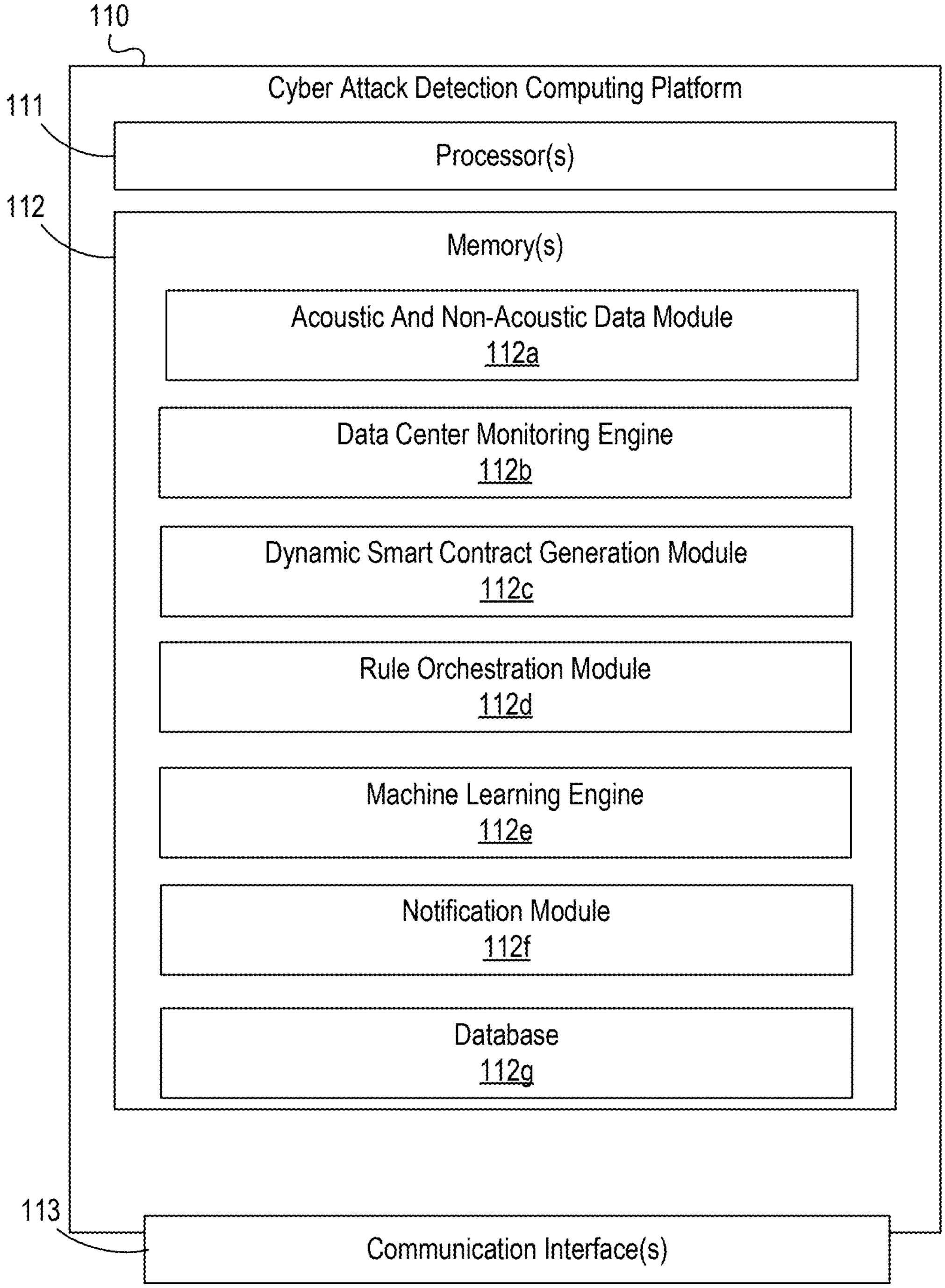

FIGS. 1A-1B depict an illustrative computing environment and devices for machine learning based detection of cyber attacks based on acoustic and non-acoustic data in accordance with one or more aspects described herein. Referring to FIG. 1A, computing environment 100 may include one or more computing devices and/or other computing systems. For example, computing environment 100 may include cyber attack detection computing platform 110, data center 120, data center 130 and internal entity computing device 140.

Although two data centers 120, 130 and one internal entity computing device 140 are shown, any number of systems or devices may be used without departing from the invention.

Cyber attack detection computing platform 110 may be or include one or more computer components (e.g., servers, server blade, processor, memory, and the like) and may be configured to perform intelligent, dynamic, cyber attack detection based on acoustic and non-acoustic data. For instance, data centers generate noise (e.g., acoustic data). Cores or processors functioning may generate a hum, cooling fans or other devices to maintain functionality of the data center may generate noise or acoustic data, processors cycling on and off may generate a beep or other indication that may register as acoustic data, and the like. This acoustic data may be captured using one or more sensors (e.g., microphones, acoustic cameras, radio frequency antennae, or other noise sensing devices).

Additionally or alternatively, non-acoustic data, such as radio frequency data, may also be captured at a data center. For instance, one or more radio frequency sensing devices may be arranged at a data center to capture radio frequency data.

Cyber attack detection computing platform 110 may receive acoustic and non-acoustic data associated with a data center and may establish a baseline or expected acoustic and/or non-acoustic data levels for the particular data center. For instance, an expected acoustic and/or non-acoustic data level for the particular data center may be determined based on captured data. In some examples, machine learning, such as a deep learning network, may be used to determine a baseline for each data center.

Cyber attack detection computing platform 110 may, after determining a baseline of acoustic and/or non-acoustic data, continuously monitor acoustic and non-acoustic data at each data center. The data may be captured and processed using machine learning to detect any anomalies in the acoustic and/or non-acoustic data. If an anomaly is detected, machine learning may be used to determine whether it is an expected to typical anomaly (e.g., increased noise based on increased processing due to month-end requirements, or the like) or whether it is a cyber attack. Cyber attack detection computing platform may then generate a notification and transmit or send the notification to one or more computing devices, such as internal entity computing device 140.

Data center 120 and/or data center 130 may be or include facilities having a plurality of processing cores executing on site. For instance, data center 120 and/or data center 130 may include a plurality of servers or other computing devices, such as devices 122, 124 and 126 at data center 120 and devices 132, 134 and 136 at data center 130. In some examples, devices 122 and 132 may include one or more sensors arranged at data center 120 and data center 130, respectively. For instance, acoustic data sensors, non-acoustic data sensors (e.g., radio frequency antennae or sensing devices) may be arranged at the respective data center 120, 130, to capture acoustic and non-acoustic data. In some examples, sensors 122 and/or 132 may include a plurality of sensors distributed throughout various areas within a respective data center, and/or may be associated with one or more banks of processors. Accordingly, an anomaly detected via a particular sensor may aid in identify potential impact of the anomaly, isolating systems or devices potentially impacted, and the like, in order to effectively mitigate potential damage.

Further, data center 120 and data center 130 may include devices 124, 126, 134 and/or 136 that may be or include one or more servers or processors. Additionally or alternatively, devices, 124, 126, 134 and/or 136 may include a plurality of banks of processors or processing cores that together process data for one or more enterprise organizations. In addition to the processing devices described, each data center may include cooling fans or other temperature control devices that may generate sound.

Internal entity computing device 140 may be or include one or more computing devices (e.g., laptop computers, desktop computers, mobile devices, tablet devices, or the like) that may be used by an employee, agent, associate or other user of the enterprise organization implementing the cyber attack detection computing platform 110. In some examples, internal entity computing device 140 may receive and/or display notifications indicating an anomaly in acoustic and/or non-acoustic data, requesting user input in response to a proposed mitigation action, or the like.

As mentioned above, computing environment 100 also may include one or more networks, which may interconnect one or more of cyber attack detection computing platform 110, data center 120, data center 130 and/or internal entity computing device 140. For example, computing environment 100 may include network 190. Network 190 may, in some examples, be a private network and include one or more sub-networks (e.g., Local Area Networks (LANs), Wide Area Networks (WANs), or the like). In some examples, network 190 may be a public network or may include a public network and private network in communication with each other. Network 190 may interconnect one or more computing devices associated with the organization and/or external to the organization. For example, cyber attack detection computing platform 110, data center 120, data center 130, and/or internal entity computing device 140 may be connected via network 190.

Referring to FIG. 1B, cyber attack detection computing platform 110 may include one or more processors 111, memory 112, and communication interface 113. A data bus may interconnect processor(s) 111, memory 112, and communication interface 113. Communication interface 113 may be a network interface configured to support communication between cyber attack detection computing platform 110 and one or more networks (e.g., network 190, or the like). Memory 112 may include one or more program modules having instructions that when executed by processor(s) 111 cause cyber attack detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of cyber attack detection computing platform 110 and/or by different computing devices that may form and/or otherwise make up cyber attack detection computing platform 110.

For example, memory 112 may have, store and/or include acoustic and non-acoustic data module 112*a*. Acoustic and non-acoustic data module 112*a* may store instructions and/or data that may cause or enable the cyber attack detection computing platform 110 to receive, from one or more sensors in data centers, such as sensors 122 in data center 120, sensors 132 in data center 130, or the like, acoustic and non-acoustic data from the respective data center. In some examples, acoustic and non-acoustic spectrograms may be generated for each data center 120, 130, processing core within a data center, area of a data center, or the like. Accordingly, baseline acoustic and non-acoustic data patterns may be identified and, as subsequent data is received and analyzed, anomalies in the spectrogram may be used to identify potential cyber attacks based on changes in acoustic or non-acoustic data.

Cyber attack detection computing platform 110 may further have, store and/or include data center monitoring engine 112*b*. Data center monitoring engine 112*b* may store instructions and/or data that may monitor subsequently received data and/or generated spectrograms to identify potential anomalies. For instance, data center monitoring engine 112*b* may extract features from generated spectrograms and generate a noise scenario. In some examples, machine learning may be used to generate and/or score the noise scenario to determine whether an anomaly is a likely cyber attack. For instance, a machine learning model hosted by machine learning engine 112*e* may be executed, using the extracted features as inputs, to output a noise scenario and a score for the generated noise scenario. The machine leaning model may identify patterns or sequences in the extracted features that may correspond to cyber attacks, non-cyber attack anomalies, or the like. Based on the analysis, the machine learning model may assign a score to each scenario that the data center monitoring engine 112*b* may compare to a threshold to determine a likelihood of cyber attack. Based on the comparing, one or more mitigation actions may be identified and executed, as determine by dynamic smart contract generation module 112*c*.

For instance, dynamic smart contract generation module 112*c* may store instructions and/or data that may cause or enable the cyber attack detection computing platform 110 to generate smart contracts based on potential attack scenarios. For instance, the machine learning model may be trained using various attack and non-attack scenarios based on acoustic data, non-acoustic data and/or a combination of both acoustic and non-acoustic data. The machine learning model may dynamically identify one or more security rules for deploying mitigation actions, such as shutting down a processor, core or bank of cores, shutting down an entire data center, modifying operation of one or more aspects of a data center (e.g., a cooling fan, a processing core, or the like), and the like. Each scenario and corresponding generated mitigation rule may be stored in a smart contract in a distributed ledger system. The distributed ledger system may provide additional security and prevent alteration of smart contracts, mitigation rules, and the like.

When a new scenario is detected, the machine learning model, via the rule orchestration module 112*d*, may dynamically generate a mitigation rule for the new scenario based on previously identified scenarios and corresponding rules. Accordingly, in some examples, generative artificial intelligence may be used to dynamically generate new mitigation rules.

Rule orchestration module 112*d* may store instructions and/or data that may cause or enable the cyber attack detection computing platform 110 to detect a new scenario generated or output by the machine learning model and receive, from the machine learning model, a dynamically generated mitigation rule. In some examples, the machine learning model may use previously generated mitigation rules from the rule orchestration module 112*d* to dynamically generate the new mitigation rule.

Cyber attack detection computing platform 110 may further have, store and/or include machine learning engine 112*e*. Machine learning engine 112*e* may store instructions and/or data that may cause or enable the cyber attack detection computing platform 110 to train, execute, update and/or validate one or more machine learning models, which may include one or more generative artificial intelligence models. For instance, the machine learning engine may receive acoustic and non-acoustic data, as well as spectrogram data, may be identify patterns or sequences in the data that may correspond to expected or baseline acoustic, non-acoustic and/or combination data for a data center 120, 130, for an area within a data center, for a particular bank of processors, or the like. The machine learning engine may train the machine learning model to correlate particular acoustic, non-acoustic and/or combination patterns to normal or expected operations within the respective data center. Accordingly, as subsequent acoustic and non-acoustic data is received, the machine learning model may analyze the data and generate a noise scenario for the received data. If the machine learning model does not detect any anomalies from the expected or baseline data, the machine learning model may assign a low score to the noise scenario, indicating that operation is normal and/or that no cyber attack is detected.

Alternatively, if the machine learning model does detect an anomaly (e.g., the machine learning model detects a change in acoustic, non-acoustic or combination data), the machine learning model may output an identification of the anomaly as a noise scenario and a corresponding score. The machine learning model may compare the noise scenario to previous noise scenarios to determine a score that indicates whether the anomaly is a cyber attack or other type of anomaly.

For instance, the machine learning model may be trained using labeled data associated with various noise scenarios. For example, various noise scenarios associated with expected operation may be used to train the machine learning model to identify expected or baseline operation. In addition, the noise scenarios may then have an anomaly introduced into the scenario. The anomaly may include labeled data identify the anomaly as, for instance, an increase in power consumption from a cooling fan due to failing operation (e.g., a non-cyber attack acoustic anomaly), an identified RFID signal within the data center (e.g., a non-acoustic data cyber attack), an increase in power consumption of processing cores due to expected increased load (e.g., a non-cyber attack acoustic anomaly), an unexpected increase in power consumption of one or more cores or banks of cores (e.g., a likely cyber attack), and the like. Accordingly, by introducing various anomalies into the training data, the machine learning model may learn to identify various types of anomalies and assign an appropriate score to each detected anomaly/scenario.

Further, the machine learning model may be trained to dynamically generate mitigation rules. For instance, a scenario and corresponding score may be similar to a previously identified scenario and score and a mitigation rule for execution may be stored in a smart contract associated with that scenario and score. However, if a new scenario is detected that does not correspond to a previous scenario and associated mitigation rule, the machine learning model may dynamically generate a mitigation rule for the newly detected scenario. For instance, the machine learning model may be trained using scenarios and corresponding mitigation actions to identify patterns or sequences in subsequently received data and dynamically generate, based on previous rules and scenarios, a new mitigation rule for the newly detected scenario. In some examples, generative artificial intelligence may be used to dynamically generate the new rule. In some examples, deep learning using one or more neural networks may be used to process the acoustic and non-acoustic data to detect anomalies, identify noise scenarios, score noise scenarios, dynamically generate new mitigation rules, and the like.

Cyber attack detection computing platform 110 may further have, store and/or include notification module **112*f*. Notification module 112*f* may store instructions and/or data that may cause or enable the cyber attack detection computing platform 110** to generate and transmit one or more notifications. For instance, in some examples, a noise scenario score may be above a threshold to automatically execute a mitigation rule associated with the scenario. Accordingly, a notification may be generated indicating the anomaly detected and indicating that the mitigation rule was automatically executed. In another example, the noise scenario score may be below an automatic execution threshold and, accordingly, a notification identifying the anomaly and the proposed mitigation rule may be generated. The notification may include a request for user input to execute the proposed mitigation rule. Various other notifications may be generated without departing from the invention.

Cyber attack detection computing platform 110 may further have, store and/or include database **112*g*. Database 112*g* may store data related to noise scenarios for training the machine learning model, generated noise scenario scores, thresholds for cyber attack vs. non-cyber attack scores, thresholds for automatic execution of mitigation rules, and/or any other data to perform the functions of cyber attack detection computing platform 110**.

FIGS. 2A-2E depict one example illustrative event sequence for cyber attack detection based on acoustic and/or non-acoustic data in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
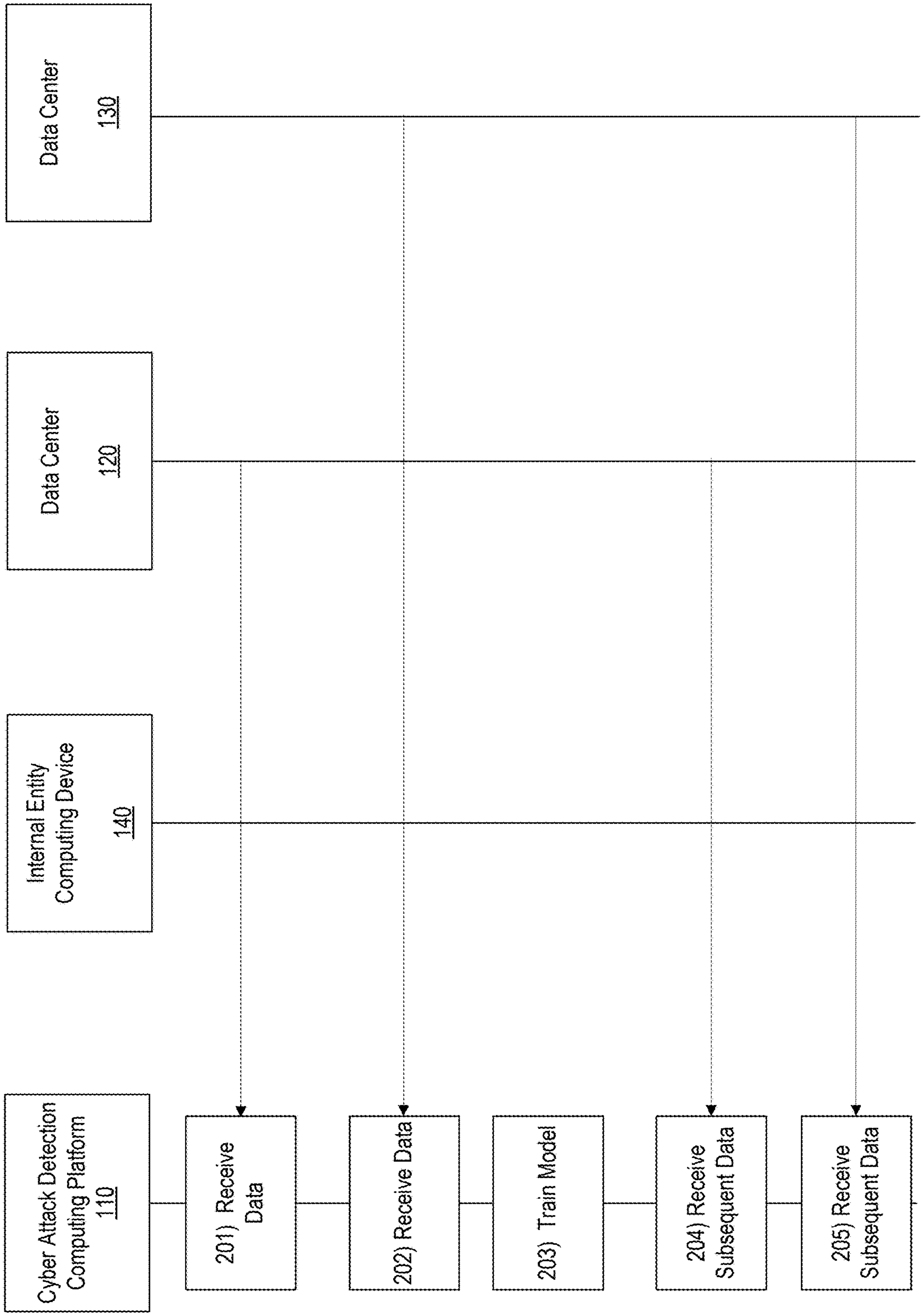
FIGS. 2A-2E depict an illustrative event sequence for using machine learning to detect cyber attacks based on acoustic and non-acoustic data in a data center in accordance with one or more aspects described herein.

With reference to FIG. 2A, at step 201, cyber attack detection computing platform 110 may receive acoustic and non-acoustic data from data center 120. For instance, sensors 122 at data center 120 may capture acoustic and non-acoustic data at the data center and may transmit or send the data to the cyber attack detection computing platform 110.

At step 202, cyber attack detection computing platform 110 may receive acoustic and non-acoustic data from data center 130. For instance, sensors 132 at data center 130 may capture acoustic and non-acoustic data at the data center and may transmit or send the data to the cyber attack detection computing platform 110.

At step 203, cyber attack detection computing platform 110 may train a machine learning model. For instance, as discussed herein, cyber attack detection computing platform 110 may train a machine learning model to detect anomalies in acoustic data, non-acoustic data, and/or a combination of acoustic and non-acoustic data and determine a likelihood of whether the anomaly is associated with a cyber attack. In some examples, the data received from data center 120 at step 201 and the data received from data center 130 at step 202 may be used to train the machine learning model. For instance, the data from data center 120 may be used to train the machine learning model to identify expected or baseline data for data center 120. Similarly, data from data center 130 may be used to train the machine learning model to identify expected or baseline data for data center 130.

Further, the acoustic and non-acoustic data from data centers 120 and 130 may be further used to train the machine learning model by introducing known anomalies into baseline data in one or more noise scenarios. For instance, a noise scenario for a respective data center may have a known anomaly introduced which may then be used to train the machine learning model to identify the known anomaly and score the known anomaly accordingly. Accordingly, the machine learning model may be trained to identify correlations between a particular noise scenario and a likelihood of cyber attack, a corresponding score, and the like. As discussed above, the anomalies may include labelled data that indicates a type of anomaly, whether the anomaly is associated with a cyber attack, and the like.

In some examples, the machine learning model may be further trained to dynamically generate mitigation rules. For instance, generative artificial intelligence may be used to generate mitigation rules for new noise scenarios (e.g., noise scenarios not seen before or not having a corresponding smart contract) based on mitigation rules for known noise scenarios.

At step 204, subsequent acoustic and/or non-acoustic data may be received from the data center 120. At step 205, subsequent acoustic and/or non-acoustic data may be received from the data center 130.

Figure 2B:
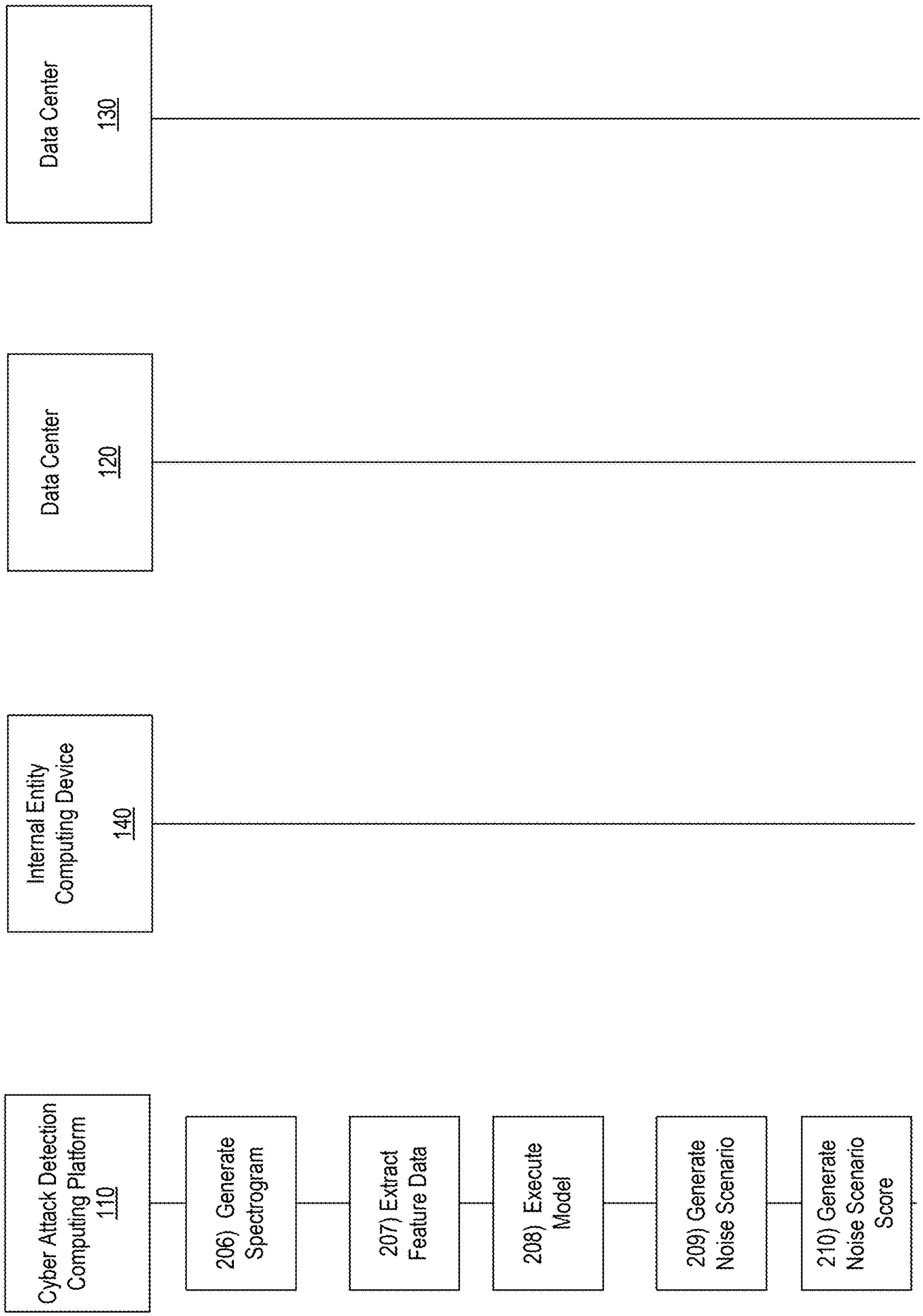

With reference to FIG. 2B, at step 206, the cyber attack detection computing platform 110 may generate a spectrogram using the acoustic and/or non-acoustic data received from data center 120 and data center 130. For instance, a first spectrogram may be generated from data received from data center 120 and a second spectrogram may be generated from data received from data center 130.

At step 207, cyber attack detection computing platform 110 may extract feature data from the generated spectrograms. For instance, cyber attack detection computing platform 110 may extract features of the acoustic, non-acoustic and/or combination data to use as inputs to the machine learning model.

At step 208, cyber attack detection computing platform 110 may input the extracted features to the machine learning model and may execute the model. For instance, the extracted features may be used as inputs and, upon execution of the model, the model may output a noise scenario for the features at step 209. In some examples, features extracted from the spectrogram generated from data from data center 120 may be input to generate or output a noise scenario for data center 120, while features extracted from the spectrogram generated from data from data center 130 may be input to generate or output a noise scenario for data center 130. In some examples, the noise scenario may include the type of data (e.g., acoustic vs. non-acoustic, combination data), and the like. In some examples, the noise scenario may identify a particular device or devices (e.g., processor, bank of processors, or the like) that is the source of the data within the noise scenario.

At step 210, each output noise scenario may be scored by the machine learning model. For instance, the machine learning model may output the noise scenario and a corresponding score indicating a likelihood that the noise scenario corresponds to a cyber attack. If the noise scenario aligns with expected or baseline scenarios for the respective data center (e.g., no anomalies are detected), the score may be very low or zero, indicating zero or virtually no likelihood of cyber attack based on acoustic and/or non-acoustic data. In some examples, as the acoustic and/or non-acoustic data deviates from expected data and the score increases, the likelihood of cyber attack also increases.

Figure 2C:
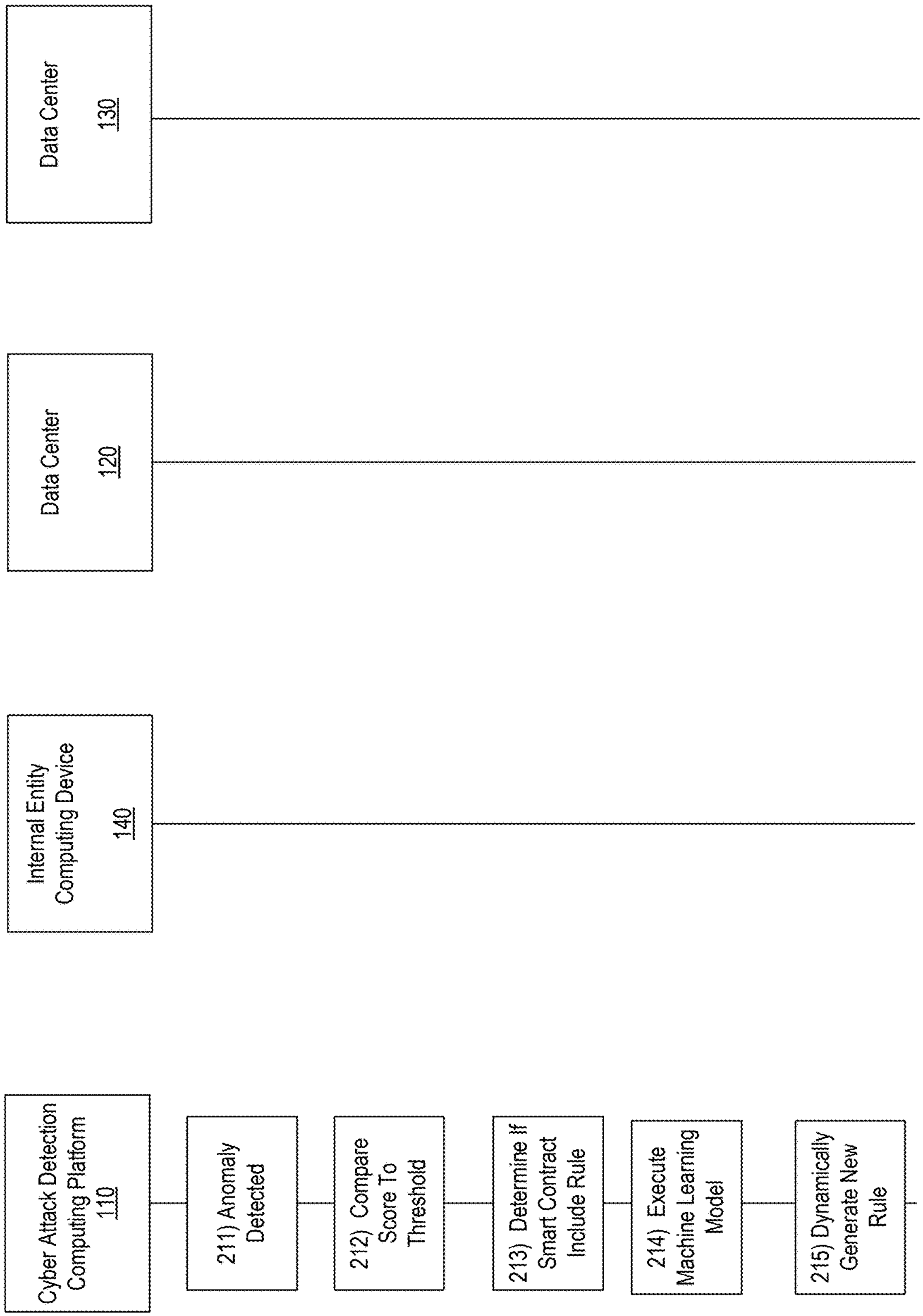

With reference to FIG. 2C, at step 211, cyber attack detection computing platform 110 may determine, based on the score for a respective noise scenario, whether an anomaly is detected. For instance, if the score is zero or very low, no anomaly has been detected and the process may continue to receive and analyze subsequent data. Alternatively, if an anomaly has been detected (e.g., a non-zero score is output or a score above a first threshold), the score for the respective noise scenario may be compared to a threshold (e.g. second threshold if first threshold used to detect anomaly) at step 212.

In some examples, the threshold may indicate whether there is a likelihood of cyber attack associated with the detected anomaly. For instance, if the score is below the threshold, the acoustic or non-acoustic anomaly may be indicative of increased processing due to heavier workloads, increased vibration in a cooling fan indicating less than optimal performance, or the like. While these anomalies should be identified for mitigating actions, they may be associated with less urgency as they are not related to a potential cyber attack. Alternatively, if the score is above the threshold, a cyber attack may be occurring and urgent mitigating action should be taken.

At step 213, the noise scenario and corresponding score may be used to determine whether a smart contract associated with the scenario is available. If so, the process may proceed to step 217 in FIG. 2D.

If no smart contract is stored, at step 214, the machine learning model may be executed to dynamically generate a mitigation rule. For instance, the noise scenario and/or score may be used as inputs to the machine learning model which may output, based on a neuro symbolic algorithm combining a neural network with binary logic, a new mitigation rule associated with the scenario and score at step 215.

Figure 2D:
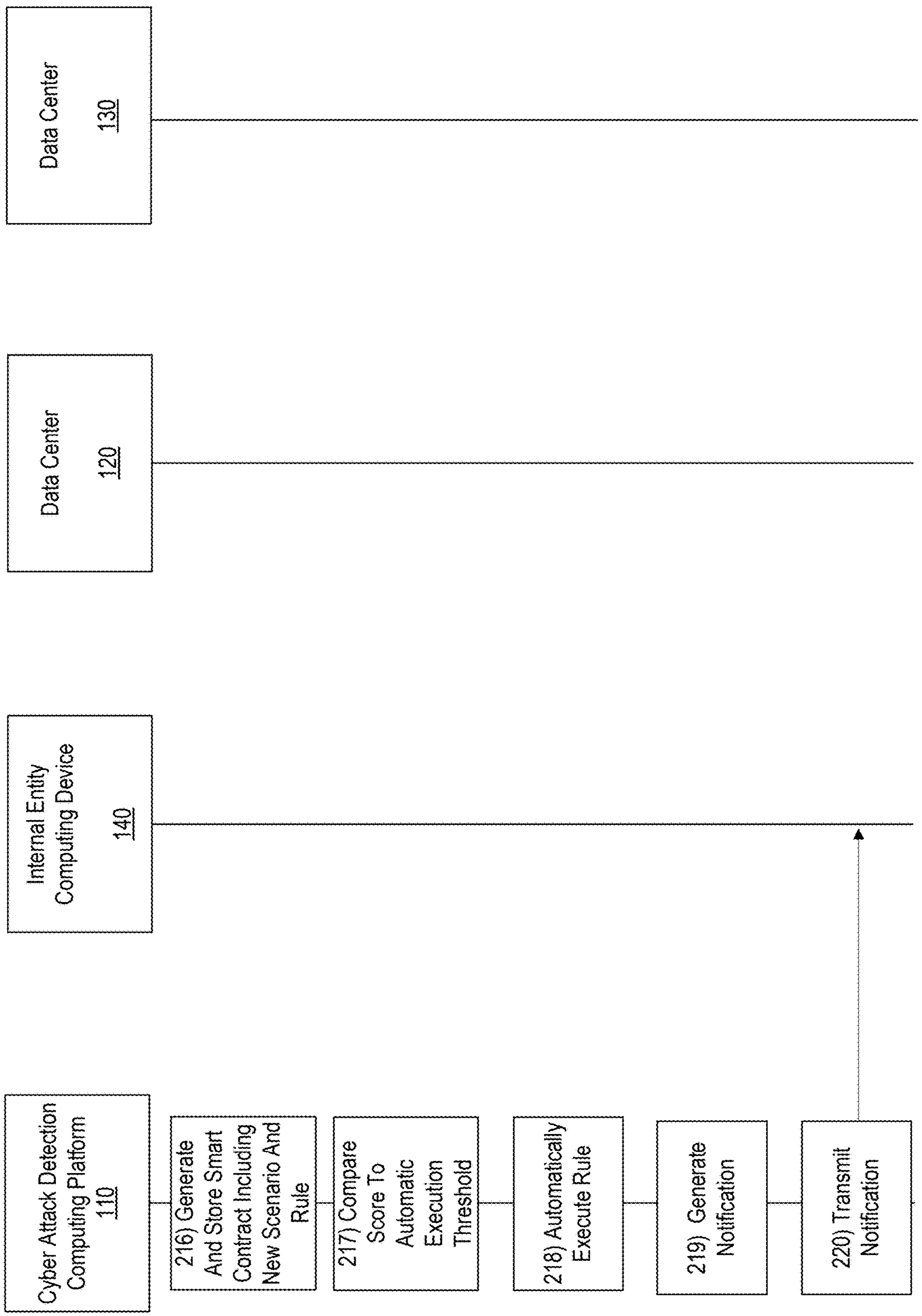

With reference to FIG. 2D, at step 216, a smart contract associated with the noise scenario and generated new mitigation rule may be generated and stored by a distributed ledger. Accordingly, upon encountering the same or similar noise scenario and score, the smart contract may be retrieved and the mitigation rule identified.

At step 217, the generated noise scenario score may be compared to an automatic mitigation rule execution threshold. For instance, a third threshold may be used to determine whether the mitigation rule identified from an associated smart contract, or a dynamically generated mitigation rule, is authorized for automatic execution (e.g., execution without user input). If the noise scenario score is at or above the threshold, the associated or identified rule may be automatically executed at step 218 and the process may proceed to step 219 where a notification indicating that the anomaly was detected and mitigation rule automatically executed may be generated.

Figure 5:
FIGS. 5 and 6 depict illustrative user interface that may be generated in accordance with one or more aspects described herein.

For instance, FIG. 5 illustrates one example notification 500 that may be generated. The notification includes identification that an anomaly was detected, a data center at which the anomaly was detected, and the mitigation rule executed. In some examples, an option for more information may be provided and, when selected, one or more additional interfaces may be displayed with additional information. Notification 500 is merely one example notification. Other data may be provided, or additional data may be provided, without departing from the invention.

If, at step 217, the noise scenario score is below the threshold for automatic execution, the process may proceed to step 219 where a notification indicating the identified anomaly and identified mitigation rule may be generated. The notification may also include a request for user input approving execution of the identified mitigation rule.

Figure 6:
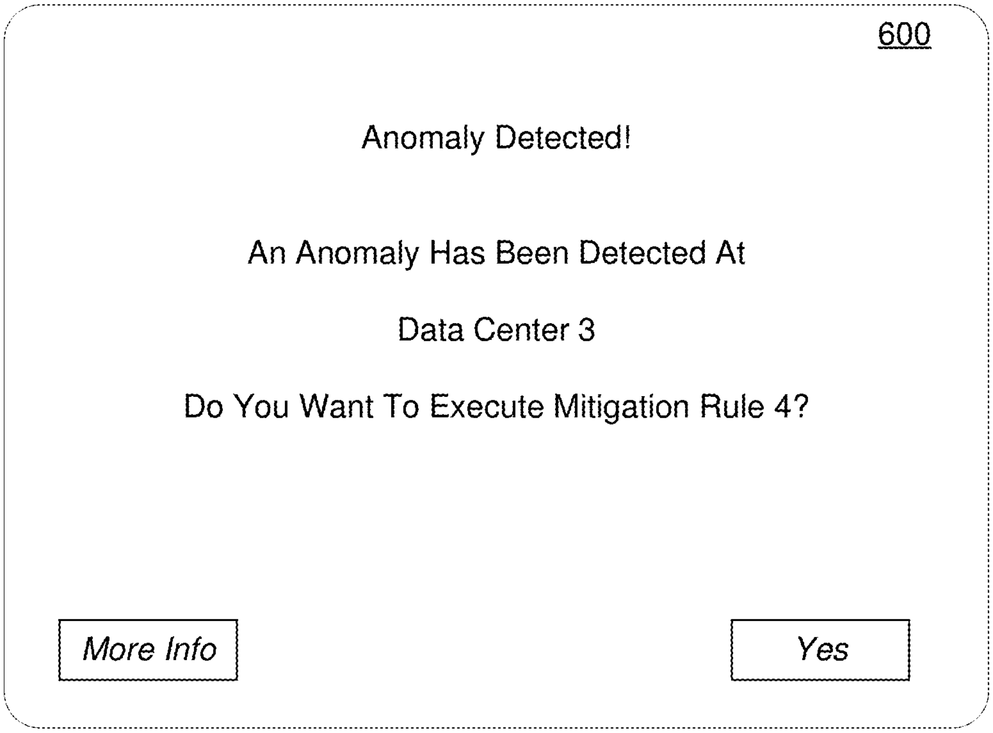

For instance, FIG. 6 illustrates one example notification 600 that may be generated. The notification includes identification that an anomaly was detected, a data center at which the anomaly was detected, and a recommended mitigation rule. The notification 600 may further include a request for user input authorizing execution of the recommended mitigation rule. In some examples, an option for more information may be provided and, when selected, one or more additional interfaces may be displayed with additional information. Notification 600 is merely one example notification. Other data may be provided, or additional data may be provided, without departing from the invention.

At step 220, the cyber attack detection computing platform 110 may transmit or send the generated notification (e.g., either the notification indicating execution of the mitigation rule or the notification requesting approval of execution of the mitigation rule) to the internal entity computing device 140. In some examples, transmitting or sending the notification may cause the notification to be displayed by a display of internal entity computing device 140.

Figure 2E:
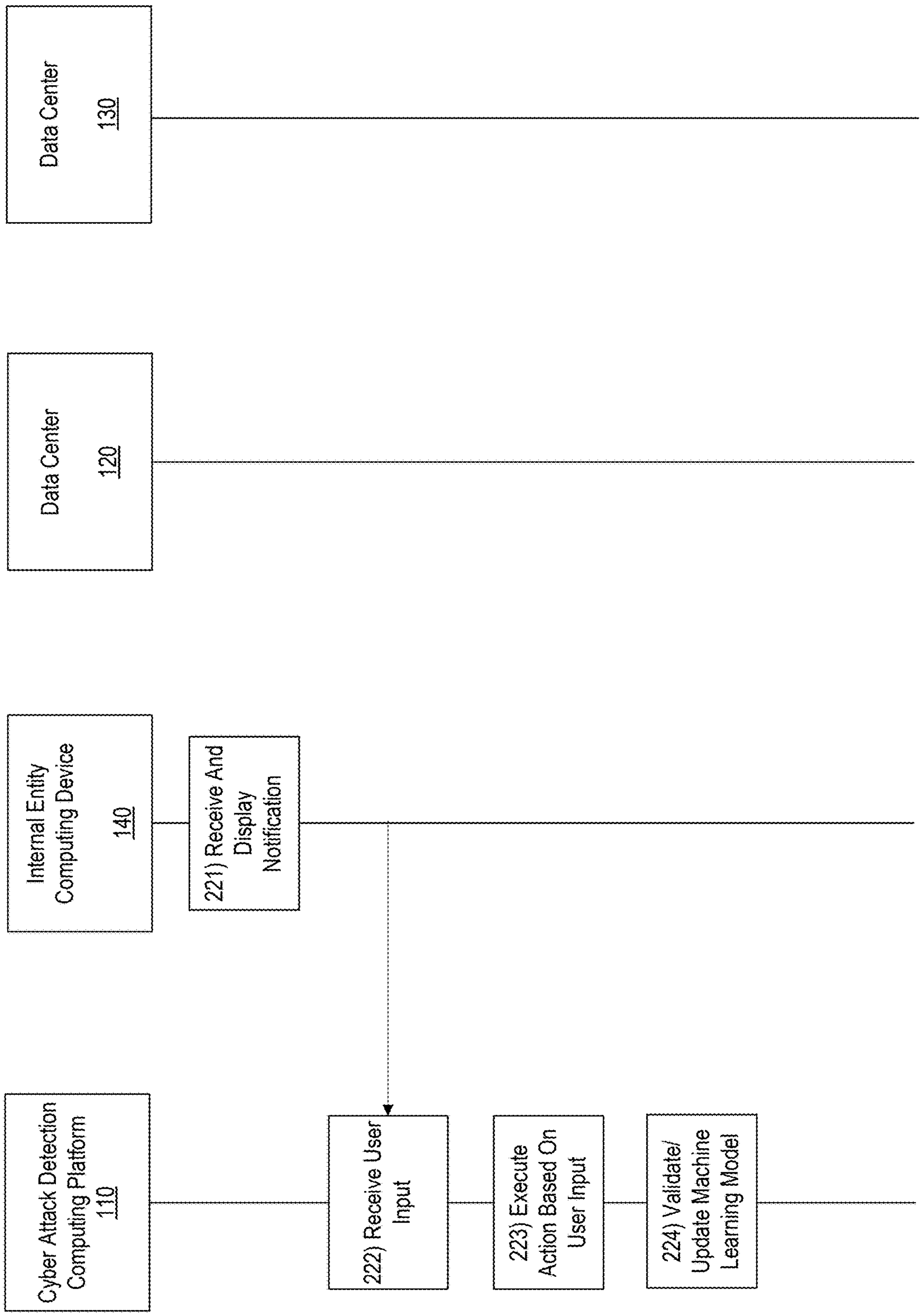

With reference to FIG. 2E, at step 221, internal entity computing device 140 may receive and display the transmitted notification. If the notification indicates that the mitigation rule was executed, the process may proceed to step 224.

If the notification includes a request for user input approving the recommended mitigation rule, at step 222, the internal entity computing device 140 may receive user input and transmit or send the user input to the cyber attack detection computing platform 110.

At step 223, based on the received user input, the cyber attack detection computing platform 110 may execute or not execute the mitigation rule. For instance, if the user input approves execution of the rule, the rule may be executed. If not, the system may hold until further input is received.

At step 224, the cyber attack detection computing platform 110 may update and/or validate the machine learning model based on automatic execution of the rule, user input responsive to the recommended rule, a noise scenario and score generated, a new mitigation rule generated, and the like. Accordingly, this feedback loop may cause the machine learning model to continuously improve accuracy of noise scenarios generated, scores generated and mitigation rules generated.

Figure 3:
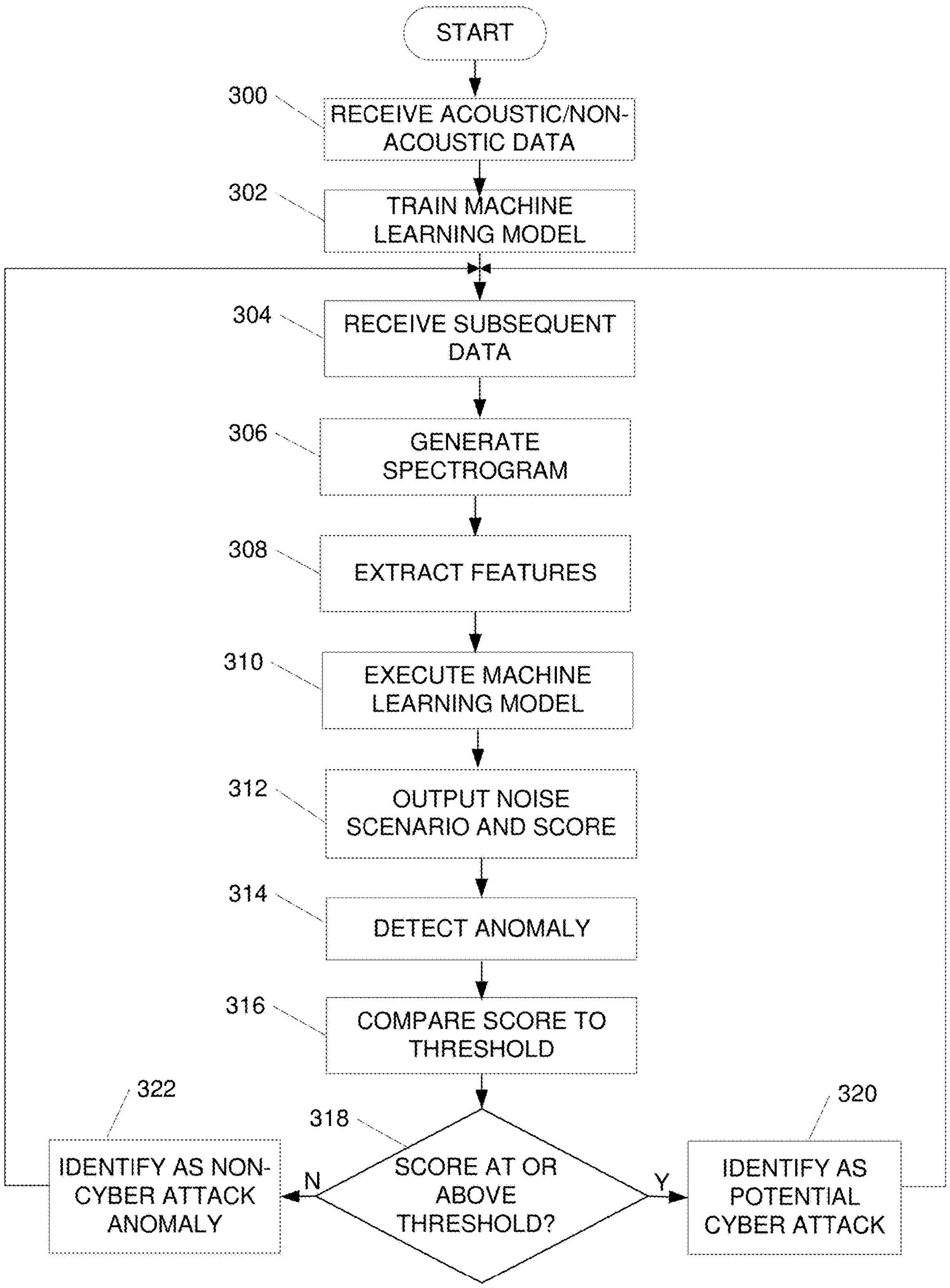
FIG. 3 illustrates an illustrative method for using machine learning to detect cyber attacks based on acoustic and non-acoustic data in a data center according to one or more aspects described herein.

FIG. 3 is a flow chart illustrating one example method of cyber attack detection using acoustic and/or non-acoustic data in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, cyber attack detection computing platform 110 may receive acoustic and non-acoustic data. For instance, cyber attack detection computing platform 110 may receive acoustic data from one or more sensors in one or more data centers, such as microphones or the like. Additionally or alternatively, non-acoustic data may be received from one or more non-acoustic data sensors, such as radio frequency antennae, in the one or more data centers.

At step 302, the cyber attack detection computing platform 110 may train a machine learning model to identify anomalies in subsequently received acoustic and/or non-acoustic data from a respective data center. For instance, the cyber attack detection computing platform 110 may train a machine learning model using the received acoustic and/or non-acoustic data. In some examples, the machine learning model may be trained using the acoustic and non-acoustic data to determine expected or baseline acoustic data, non-acoustic data and/or a combination or amalgamation of acoustic and non-acoustic data for a particular data center. In some examples, the cyber attack detection computing platform 110 may then introduce known anomaly scenarios (e.g., labelled data) into the training data to train the machine learning model to identify a type of anomaly associated with different noise scenarios (e.g., an increase in radio frequency data detection may indicate a cyber attack).

At step 304, cyber attack detection computing platform 110 may receive subsequent acoustic and non-acoustic data from one or more sensors in a particular data center.

At step 306, cyber attack detection computing platform 110 may generate, based on the subsequent acoustic and non-acoustic data, a spectrogram of the data.

At step 308, cyber attack detection computing platform 110 may extract, from the spectrogram, features of the subsequent acoustic and non-acoustic data.

At step 310, cyber attack detection computing platform 110 may execute the machine learning model. For instance, cyber attack detection computing platform 110 may input, to the machine learning model, the features extracted from the spectrogram and may execute the model to output a noise scenario and corresponding noise scenario score at step 312.

For instance, the machine learning model may output a noise scenario corresponding to the subsequent acoustic and non-acoustic data and may output or generate a noise scenario score corresponding to the noise scenario. The noise scenario score may indicate how closely the data matches expected or baseline data (e.g., a very low or zero noise scenario score), as well as a likelihood that a detected anomaly corresponds to a cyber attack or potential cyber attack (e.g., as the score increases, the likelihood of anomaly increases and the likelihood of the anomaly being associated with a cyber attack increases). For example, a noise scenario score of zero may indicate expected or baseline data, a noise scenario score of 50 may indicate that an anomaly is detected (e.g., the data does not match expected or baseline data) but that the anomaly is not likely due to a cyber attack and a score of 100 may indicate that an anomaly is detected and that the anomaly is likely due to a cyber attack or potential cyber attack. This scoring scenario is merely one example and various other scoring arrangements, ranges or scales, and the like, may be used without departing from the invention.

At step 314, based on the noise scenario and noise scenario score generated by the machine learning model, cyber attack detection computing platform 110 may detect an anomaly in the subsequent acoustic and/or non-acoustic data. For instance, the noise scenario and/or subsequent acoustic and/or non-acoustic data may be compared to expected or baseline data to identify one or more differences between the expected data and the subsequent data and/or noise scenario.

At step 316, cyber attack detection computing platform 110 may compare the noise scenario score to a first threshold to determine whether the detected anomaly corresponds to a cyber attack or potential cyber attack.

At step 318, the cyber attack detection computing platform 110 may determine whether the score is at or above the first threshold. If so, at step 320, the cyber attack detection computing platform 110 may identify the anomaly as a cyber attack or potential cyber attack.

If, at step 318, the score is not at or above the first threshold, the cyber attack detection computing platform 110 may determine that the anomaly is not due to a cyber attack or potential cyber attack.

In some examples, various mitigation rules may then be identified and executed to mitigate impact of the issue causing the anomaly. For instance, the cyber attack detection computing platform 110 may determine whether a smart contract including a mitigation rule exists for the noise scenario and, if so, may retrieve the mitigation rule from the smart contract. In some arrangements, the noise scenario score may be compared to a second threshold to determine whether the identified mitigation rule is eligible for automatic execution (e.g., without user input). If the score is at or above the second threshold, the mitigation rule may be automatically executed. if not, user input may be requested before executing the mitigation rule. The mitigation rule may include, for instance, powering off or otherwise modifying processing at a processor or bank of processors, migrating data processing to an alternate data center, powering down a cooling fan, or the like.

The process may return to step 304 to receive and analyze additional subsequent data.

Figure 4:
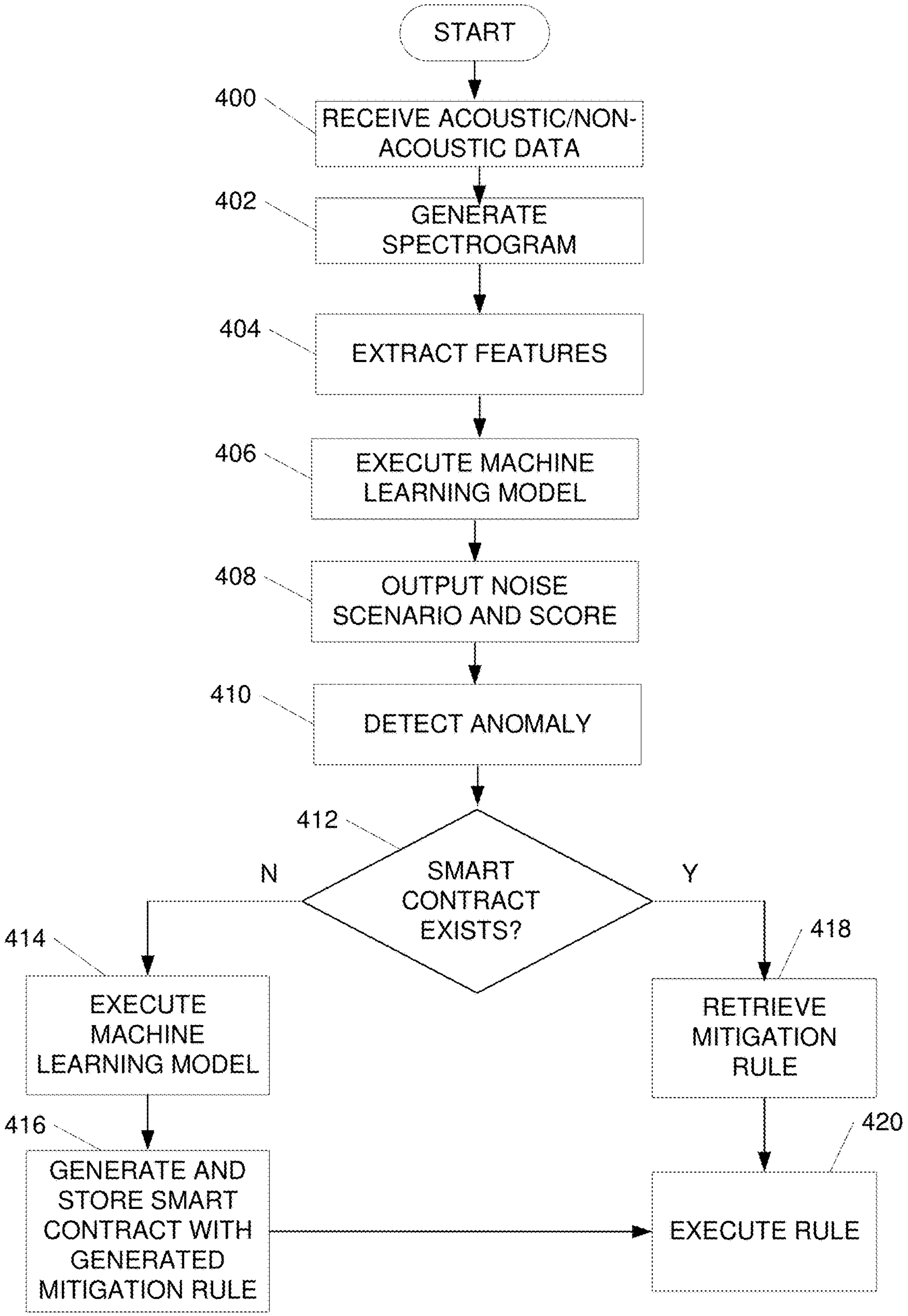
FIG. 4 illustrates another illustrative method for using machine learning to detect cyber attacks based on acoustic and non-acoustic dat in a data center in accordance with one or more aspects described herein.

FIG. 4 is a flow chart illustrating another example method of cyber attack detection using acoustic and/or non-acoustic data in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, cyber attack detection computing platform 110 may receive acoustic and non-acoustic data. For instance, cyber attack detection computing platform 110 may receive acoustic data from one or more sensors in one or more data centers, such as microphones or the like. Additionally or alternatively, non-acoustic data may be received from one or more non-acoustic data sensors, such as radio frequency antennae, in the one or more data centers.

At step 402, cyber attack detection computing platform 110 may generate, based on the acoustic and non-acoustic data, a spectrogram of the data.

At step 404, cyber attack detection computing platform 110 may extract, from the spectrogram, features of the subsequent acoustic and non-acoustic data.

At step 406, cyber attack detection computing platform 110 may execute the machine learning model. For instance, cyber attack detection computing platform 110 may input, to the machine learning model, the features extracted from the spectrogram and may execute the model to output a noise scenario and corresponding noise scenario score at step 408.

For instance, the machine learning model may output a noise scenario corresponding to the acoustic and non-acoustic data and may output or generate a noise scenario score corresponding to the noise scenario. The noise scenario score may indicate how closely the data matches expected or baseline data (e.g., a very low or zero noise scenario score), as well as a likelihood that a detected anomaly corresponds to a cyber attack or potential cyber attack (e.g., as the score increases, the likelihood of anomaly increases and the likelihood of the anomaly being associated with a cyber attack increases). For example, a noise scenario score of zero may indicate expected or baseline data, a noise scenario score of 50 may indicate that an anomaly is detected (e.g., the data does not match expected or baseline data) but that the anomaly is not likely due to a cyber attack and a score of 100 may indicate that an anomaly is detected and that the anomaly is likely due to a cyber attack or potential cyber attack. This scoring scenario is merely one example and various other scoring arrangements, ranges or scales, and the like, may be used without departing from the invention.

At step 410, based on the noise scenario and noise scenario score generated by the machine learning model, cyber attack detection computing platform 110 may detect an anomaly in the acoustic and/or non-acoustic data. For instance, the noise scenario and/or acoustic and/or non-acoustic data may be compared to expected or baseline data to identify one or more differences between the expected data and the acoustic and/or non-acoustic data and/or noise scenario.

At step 412, based on the noise scenario and/or noise scenario score, the cyber attack detection computing platform 110 may determine whether a smart contract exists (e.g., is stored in a distributed ledger) for the noise scenario.

If, at step 412, a smart contract exists for the noise scenario, cyber attack detection computing platform 110 may retrieve a mitigation rule from the stored smart contract at step 418 and the process may proceed to step 420. In some examples, the mitigation rule may be based on the anomaly detected (e.g., based on type of data, type of anomaly, or the like). The mitigation rule may include instructions or commands that may cause modification of operations within a data center, modification of functioning of a device within the data center, or the like. For instance, the mitigation rule may include instructions for a particular processor at which the anomaly was detected to shut down until an investigation may be performed. Various other rules may be used without departing from the invention If, at step 412, a smart contract does not exist, at step 414, the cyber attack detection computing platform 110 may execute the machine learning model to output a dynamically generated mitigation rule for the noise scenario. For instance, the noise scenario, noise scenario score, one or more features of the acoustic and/or non-acoustic data, and the like, may be input to the machine learning model and the model may be executed to output a dynamically generated mitigation rule associated with the noise scenario.

At step 416, based on the dynamically generated mitigation rule for the noise scenario, a smart contract corresponding to the noise scenario and including the dynamically generated mitigation rule may be generated and stored. For instance, the smart contract may be stored in the distributed ledger. The process may then proceed to step 420.

At step 420, the cyber attack detection computing platform 110 may execute one of the retrieved mitigation rule or the dynamically generated mitigation rule. In some examples, executing the one of the retrieved mitigation rule or the dynamically generated mitigation rule may be performed automatically (e.g., without user input). In some arrangements, the cyber attack detection computing platform 110 may generate a notification including the identified anomaly and one of the retrieved mitigation rule or the dynamically generated mitigation rule. The notification may further include a request for user input authorizing execution of one of the retrieved mitigation rule or the dynamically generated mitigation rule. The cyber attack detection computing platform 110 may transmit the notification to a computing device which may cause the computing device to display the notification on a display of the computing device.

As discussed herein, the arrangements described include aspects related to using acoustic data, non-acoustic data and/or a combination of acoustic and non-acoustic data to detect anomalies in a data center and determine whether the detected anomalies are associated with a cyber attack or potential cyber attack. For instance, machine learning may be used to determine or identify expected or baseline acoustic data, non-acoustic data and/or a combination of acoustic and non-acoustic data for a respective data center and may then be used to analyze subsequently received data to identify anomalies or differences between the subsequently received data and the expected or baseline data. The anomalies may then be further analyzed to determine whether they likely correspond to a cyber attack or potential cyber attack, or are related to non-cyber attack anomalies.

As discussed herein, acoustic data may relate to audible noises or data that may be captured by one or more microphones or other sensors within a data center. Non-acoustic data may relate to radio frequency data that may be captured by one or more radio frequency antennae or other sensors within the data center. During normal operation of a data center, acoustic sounds may be generated by the processors processing data (e.g., a humming sound may be emitted), cooling systems running or cycling on and off, physical interactions between processors in racks, and the like. This low-decibel noise may be captured by one or more sensors within the data center and used to identify baseline or expected data, anomalies from baseline or expected data, and the like.

In some examples, an increase in, for example, acoustic data, might not be indicative of a cyber attack. For instance, data centers may emit increased sounds when processing increases, such as during high work load periods (e.g., quarter-end, year-end or the like), when additional processing is requested, when a device is operating outside of expected range (e.g., a cooling system fan may be malfunctioning or in need of maintenance and may generate additional noise), and the like. In other examples, processors may cycle on and off within the data center and may emit an indicator noise (e.g., a "beep") when they cycle on or off. These sounds may be detected as anomalies but identified, by the machine learning model, as not likely cyber attack related. Accordingly, mitigation actions may be taken but the issues will not be treated as a cyber attack.

For non-acoustic data, a switch or other device may generate or create radio frequency waves that may be captured by a radio frequency antenna or sensor that may record, for instance, voltage. In another example, naturally occurring solar flares can create electrical waves that may disrupt systems. The increased activity detected based on the malfunctioning switch or solar flare may be captured and identified as an anomaly but, based on the machine learning analysis, may be identified as not likely cyber-attack related.

Alternatively, increased acoustic and/or non-acoustic data may indicate a cyber attack or potential cyber attack. For instance, a threat actor may use high voltage radio frequency waves to disrupt operation of the data center. For instance, increased voltage bombarding the data center may cause damage to chips, which may disrupt operations. Further, threat actors may use various hacking techniques to access and/or modify or disrupt operation of the data center which may generate acoustic data that may be analyzed to detect anomalies and determine whether the anomaly is cyber attack related.

In some examples, non-acoustic data issues may cause acoustic data to be generated. For instance, a radio frequency attack on a data center may cause an increase in voltage which may increase power consumption and cause fans on processors to run more, thereby increasing the noise or acoustic data generated by the processor. In another example, if a threat actor is attacking a data center using radio frequency waves, it may cause one or more processors to power off, which may cause the processor to emit an indication (e.g., "beep") that it is powering down. This indication may be an anomaly in the acoustic data for that data center.

In some examples, baseline or expected data may be modified based on trends in data center data, seasonal changes in processing, and the like. For instance, during a holiday shopping season, data processing may increase at a data center. Accordingly, the expected or baseline data for that season may be modified to account for the expected increased processing. Further, trends within data center data may be monitored to understand when retraining of the machine learning model to accommodate changes in expected data should be performed.

Although various aspects described herein are generally related to receiving data associated with acoustic and non-acoustic data in a data center, as discussed herein, in some examples, a plurality of sensors may be distributed throughout a data center and data from sensors may be labeled and/or analyzed to isolate or identify particular systems, devices, or the like, impacted by an anomaly. For instance, acoustic data near or associated with a first bank of processors may indicate an anomaly in that bank of processors and, accordingly, a mitigation rule may include actions associated with that bank of processors. In some examples, data associated with particular processors within a bank of processors may be used to prioritize mitigation rule actions (e.g., a first processor within a bank of processors may be associated with payment processing and may be shut down first if an anomaly is detected and a mitigation rule indicates shut down).

Additionally or alternatively, in some examples, radio frequency antennae may be used to not only detect radio frequency data but may also detect a direction from which the waves are being received. This may aid in identify potential impact within the data center, a source of the radio frequency waves (e.g., a location of a threat actor), or the like.

Further, while various mitigation rules are described as generally related to security of devices, data, and the like, in some examples, mitigation rules may also include business rules that are associated with one or more business groups, regulatory groups, and the like.

While various examples and arrangements described herein are directed to detecting anomalies and determining potential cyber attacks, the arrangements described herein may also be used to optimize processing within a data center, between data centers, and the like. For instance, if a particular bank of processors is in an overload situation as determined by acoustic data, processing associated with that bank of processors may be distributed to another bank of processors, to another data center, or the like, in order to reduce load.

Further, the arrangements described herein may be used in the design of future data centers. For instance, by understanding acoustic and non-acoustic data patterns, designers can design data centers to minimize noise, position noise heavy areas in particular locations within the data center, or the like. The acoustic and non-acoustic data may also help designers understand what scenarios cause increased data, such that they can accommodate those scenarios in design decisions.

Figure 7:
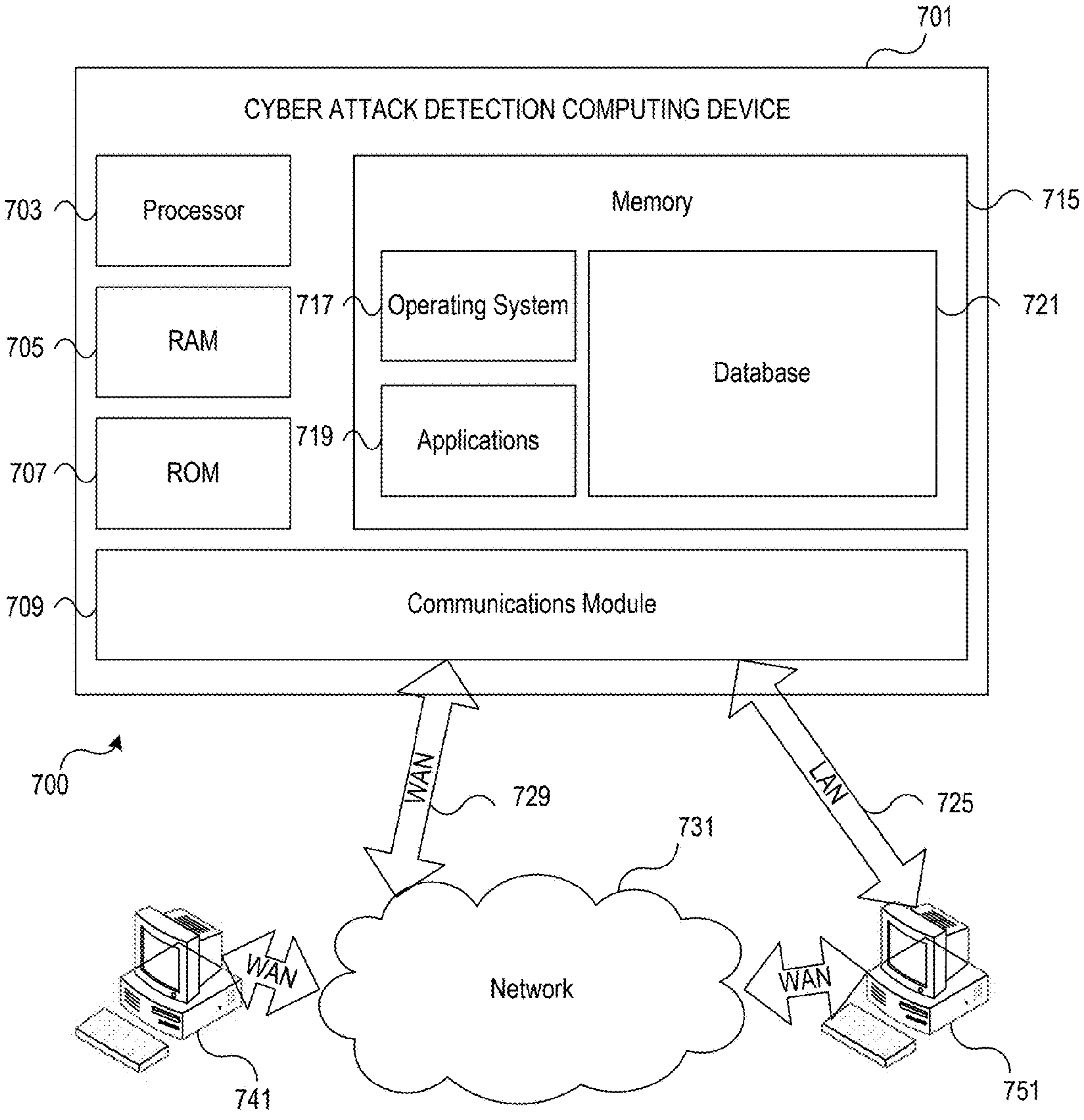
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include cyber attack detection computing device 701 having processor 703 for controlling overall operation of cyber attack detection computing device 701 and its associated components, including Random Access Memory (RAM) 705, Read-Only Memory (ROM) 707, communications module 709, and memory 715. Cyber attack detection computing device 701 may include a variety of computer readable media. Computer readable media may be any available media that may be accessed by cyber attack detection computing device 701, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by cyber attack detection computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor (e.g., hardware processor) on cyber attack detection computing device 701. Such a processor may execute computer-executable instructions stored on a computer-readable medium.

Software may be stored within memory 715 and/or storage to provide instructions to processor 703 for enabling cyber attack detection computing device 701 to perform various functions as discussed herein. For example, memory 715 may store software used by cyber attack detection computing device 701, such as operating system 717, application programs 719, and associated database 721. Also, some or all of the computer executable instructions for cyber attack detection computing device 701 may be embodied in hardware or firmware. Although not shown, RAM 705 may include one or more applications representing the application data stored in RAM 705 while cyber attack detection computing device 701 is on and corresponding software applications (e.g., software tasks) are running on cyber attack detection computing device 701.

Communications module 709 may include a microphone, keypad, touch screen, and/or stylus through which a user of cyber attack detection computing device 701 may provide input, and may also include one or more of a speaker for providing audio output and a video display device for providing textual, audiovisual and/or graphical output. Computing system environment 700 may also include optical scanners (not shown).

Cyber attack detection computing device 701 may operate in a networked environment supporting connections to one or more remote computing devices, such as computing devices 741 and 751. Computing devices 741 and 751 may be personal computing devices or servers that include any or all of the elements described above relative to cyber attack detection computing device 701.

The network connections depicted in FIG. 7 may include Local Area Network (LAN) 725 and Wide Area Network (WAN) 729, as well as other networks. When used in a LAN networking environment, cyber attack detection computing device 701 may be connected to LAN 725 through a network interface or adapter in communications module 709. When used in a WAN networking environment, cyber attack detection computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive acoustic and non-acoustic data captured by one or more sensors in a data center;
generate, based on the acoustic and non-acoustic data captured by the one or more sensors in the data center, a spectrogram of the acoustic and non-acoustic data;
extract, from the spectrogram, features of the acoustic and non-acoustic data;

execute a machine learning model, wherein executing the machine learning model includes inputting the extracted features from the spectrogram to output a noise scenario and noise scenario score corresponding to the acoustic and non-acoustic data;

determine, based on the output noise scenario and noise scenario score, that an anomaly is detected in the acoustic and non-acoustic data;

determine, based on the detected anomaly, noise scenario and noise scenario score, whether a smart contract exists for the noise scenario;

responsive to determining that a smart contract exists for the noise scenario, retrieve a mitigation rule from the smart contract;

responsive to determining that a smart contract does not exist for the noise scenario:

execute the machine learning model to output a dynamically generated mitigation rule for the noise scenario;

generate a smart contract including the dynamically generated mitigation rule for the noise scenario; and store the generated smart contract; and execute one of the retrieved mitigation rule or the dynamically generated mitigation rule.

2. The computing platform of claim 1, wherein the executing one of the retrieved mitigation rule or the dynamically generated mitigation rule is performed automatically.

3. The computing platform of claim 1, further including instructions that, when executed, cause the computing platform to:

generate a notification including the detected anomaly and one of the retrieved mitigation rule or the dynamically generated mitigation rule, wherein the notification further includes a request for user input authorizing execution of one of the retrieved mitigation rule or the dynamically generated mitigation rule; and transmit the generated notification to a computing device, wherein transmitting the notification causes the notification to be displayed by a display of the computing device.

4. The computing platform of claim 1, wherein the acoustic data is captured via one or more microphones in the data center.

5. The computing platform of claim 1, wherein the non-acoustic data includes radio frequency data captured by one or more radio frequency sensors in the data center.

6. The computing platform of claim 1, further including instructions that, when executed, cause the computing platform to:

train the machine learning model to dynamically generate mitigation rules, wherein training the machine learning model includes using mitigation rules from other noise scenarios to train the machine learning model to dynamically generate mitigation rules.

7. The computing platform of claim 6, wherein the machine learning model includes a generative artificial intelligence model.

8. A method, comprising:

receiving, by a computing platform, the computing platform having at least one processor, and memory, acoustic and non-acoustic data captured by one or more sensors in a data center;

generating, by the at least one processor and based on the acoustic and non-acoustic data captured by the one or more sensors in the data center, a spectrogram of the acoustic and non-acoustic data;

extracting, by the at least one processor and from the spectrogram, features of the acoustic and non-acoustic data;

executing, by the at least one processor, a machine learning model, wherein executing the machine learning model includes inputting the extracted features from the spectrogram to output a noise scenario and noise scenario score corresponding to the acoustic and non-acoustic data;

determining, by the at least one processor and based on the output noise scenario and noise scenario score, that an anomaly is detected in the acoustic and non-acoustic data;

determining, by the at least one processor and based on the detected anomaly, noise scenario and noise scenario score, whether a smart contract exists for the noise scenario;

responsive to determining that a smart contract exists for the noise scenario, retrieving, by the at least one processor, a mitigation rule from the smart contract;

responsive to determining that a smart contract does not exist for the noise scenario:

executing, by the at least one processor, the machine learning model to output a dynamically generated mitigation rule for the noise scenario;

generating, by the at least one processor, a smart contract including the dynamically generated mitigation rule for the noise scenario; and storing the generated smart contract; and executing, by the at least one processor, one of the retrieved mitigation rule or the dynamically generated mitigation rule.

9. The method of claim 8, wherein the executing one of the retrieved mitigation rule or the dynamically generated mitigation rule is performed automatically.

10. The method of claim 8, further including:

generating, by the at least one processor, a notification including the detected anomaly and one of the retrieved mitigation rule or the dynamically generated mitigation rule, wherein the notification further includes a request for user input authorizing execution of one of the retrieved mitigation rule or the dynamically generated mitigation rule; and transmitting, by the at least one processor, the generated notification to a computing device, wherein transmitting the notification causes the notification to be displayed by a display of the computing device.

11. The method of claim 8, wherein the acoustic data is captured via one or more microphones in the data center.

12. The method of claim 8, wherein the non-acoustic data includes radio frequency data captured by one or more radio frequency sensors in the data center.

13. The method of claim 8, further:

training, by the at least one processor, the machine learning model to dynamically generate mitigation rules, wherein training the machine learning model includes using mitigation rules from other noise scenarios to train the machine learning model to dynamically generate mitigation rules.

14. The method of claim 13, wherein the machine learning model includes a generative artificial intelligence model.

15. One or more non-transitory computer-readable media storing instructions that, when executed by a computing platform comprising at least one processor, memory, and a communication interface, cause the computing platform to:

receive acoustic and non-acoustic data captured by one or more sensors in a data center;

generate, based on the acoustic and non-acoustic data captured by the one or more sensors in the data center, a spectrogram of the acoustic and non-acoustic data;

extract, from the spectrogram, features of the acoustic and non-acoustic data;

execute a machine learning model, wherein executing the machine learning model includes inputting the extracted features from the spectrogram to output a noise scenario and noise scenario score corresponding to the acoustic and non-acoustic data;

determine, based on the output noise scenario and noise scenario score, that an anomaly is detected in the acoustic and non-acoustic data;

determine, based on the detected anomaly, noise scenario and noise scenario score, whether a smart contract exists for the noise scenario;

responsive to determining that a smart contract exists for the noise scenario, retrieve a mitigation rule from the smart contract;

responsive to determining that a smart contract does not exist for the noise scenario:

execute the machine learning model to output a dynamically generated mitigation rule for the noise scenario;

generate a smart contract including the dynamically generated mitigation rule for the noise scenario; and store the generated smart contract; and execute one of the retrieved mitigation rule or the dynamically generated mitigation rule.

16. The one or more non-transitory computer-readable media of claim 15, wherein the executing one of the retrieved mitigation rule or the dynamically generated mitigation rule is performed automatically.

17. The one or more non-transitory computer-readable media of claim 15, further including instructions that, when executed, cause the computing platform to:

generate a notification including the detected anomaly and one of the retrieved mitigation rule or the dynamically generated mitigation rule, wherein the notification further includes a request for user input authorizing execution of one of the retrieved mitigation rule or the dynamically generated mitigation rule; and transmit the generated notification to a computing device, wherein transmitting the notification causes the notification to be displayed by a display of the computing device.

18. The one or more non-transitory computer-readable media of claim 15, wherein the non-acoustic data includes radio frequency data captured by one or more radio frequency sensors in the data center.

19. The one or more non-transitory computer-readable media of claim 15, further including instructions that, when executed, cause the computing platform to:

train the machine learning model to dynamically generate mitigation rules, wherein training the machine learning model includes using mitigation rules from other noise scenarios to train the machine learning model to dynamically generate mitigation rules.

20. The one or more non-transitory computer-readable media of claim 19, wherein the machine learning model includes a generative artificial intelligence model.

* * * * *